Feb. 11, 1941.       C. F. BURGESS       2,231,319
DRY CELL
Filed Sept. 25, 1936
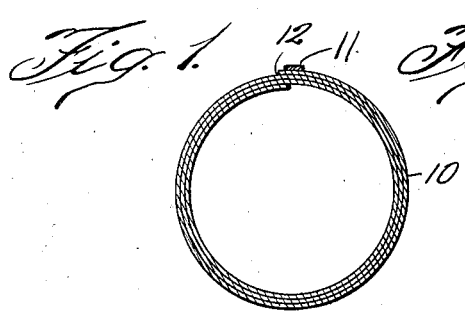
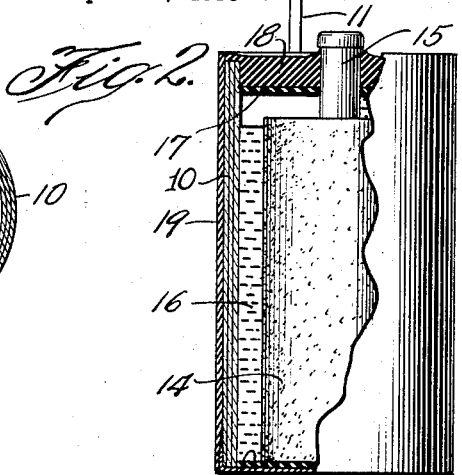
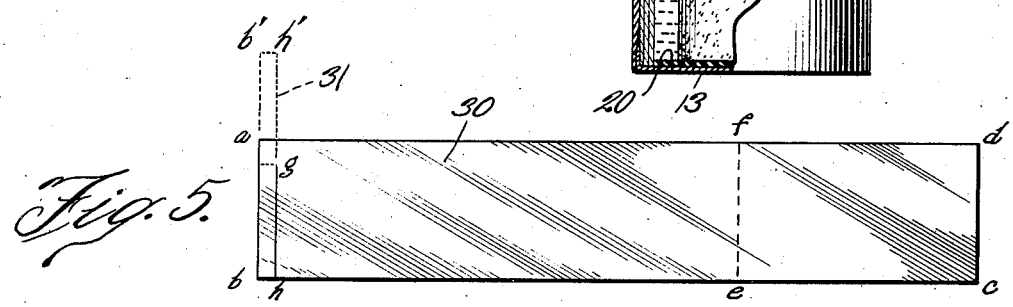
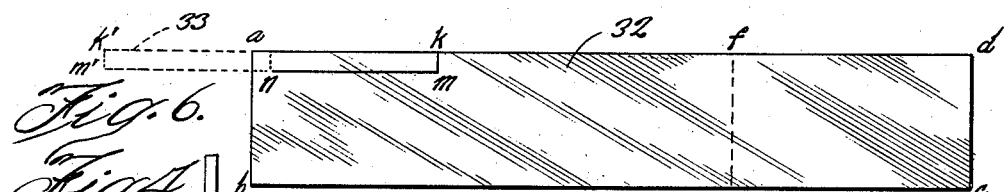
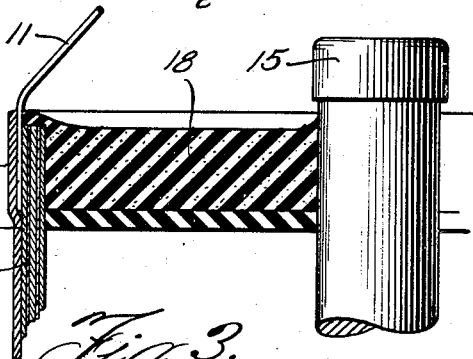
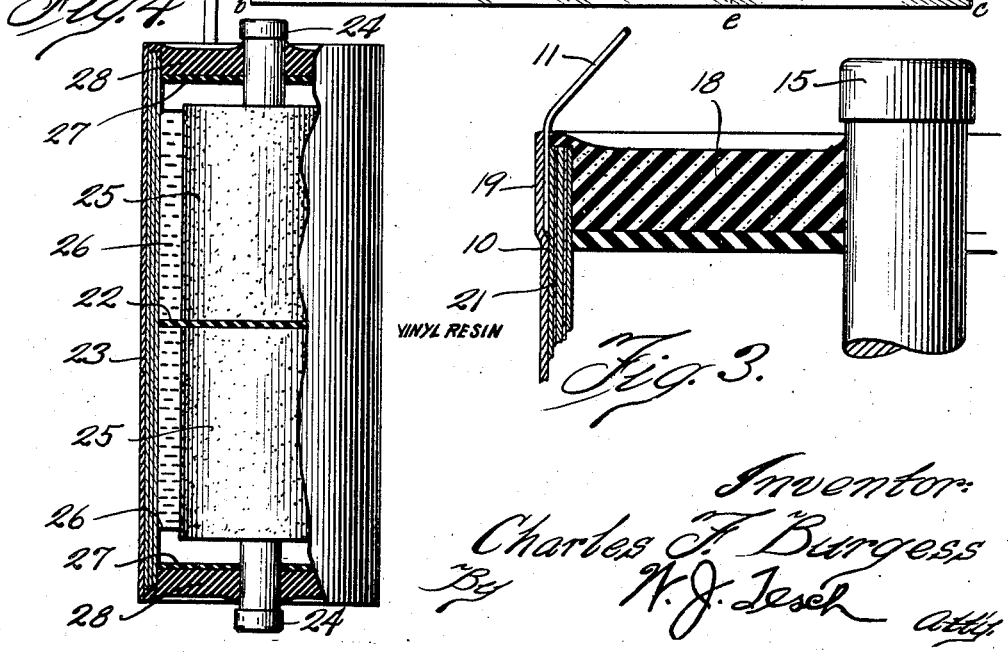
Inventor:
Charles F. Burgess
By W. J. Jesch
Atty.

Patented Feb. 11, 1941

2,231,319

UNITED STATES PATENT OFFICE 2,231,319

DRY CELL

Charles F. Burgess, Bokeelia, Fla., assignor, by mesne assignments, to Burgess Battery Company, Chicago, Ill., a corporation of Delaware Application September 25, 1936, Serial No. 102,530

1 Claim. (Cl. 136—127)

This invention relates to a dry cell of the Le Clanche type in which the zinc electrode consists of a multiplicity of layers of zinc.

It is an object of this invention to provide a dry cell having improved characteristics over those of a dry cell employing an electrode comprising a single layer of zinc.

It is a further object of the invention to provide means for protecting a dry cell against excessive initial voltages and against local action.

This invention is illustrated in the accompanying drawing in which:

Fig. 1 is a sectional view of a strip of zinc rolled into a cylindrical tube;

Fig. 2 is a view, partly in section, of a cylindrical dry cell employing a zinc tube such as is illustrated in Fig. 1;

Fig. 3 is an enlarged fragmental sectional view of the dry cell of Fig. 2;

Fig. 4 is a view, partly in section, of a different form of the dry cell employing the multiple layer electrode shown in Fig. 1 and Figs. 5 and 6 are views of strips of sheet zinc formed so as to provide terminal leads integral therewith, shown prior to rolling thereof into a tube.

My invention is applicable especially to the production of the cylindrical type of zinc dry cell can, although it may be applied to the production of the electrodes of other forms of dry cells such as those of the flat or plate type. The can, or other form of electrode, is made by superimposing a number of layers of thin zinc sheets or zinc foil, the several sheets preferably being attached to each other by means of a suitable adhesive as described hereinafter. A cylindrical can is made by rolling a thin sheet of zinc on a cylindrical core or mandril until a tube of the desired wall thickness is obtained and then applying a bottom closure member to one end of the tube. The depolarizing mix, electrolyte paste, carbon rod and seal are then introduced into the can in the usual way.

In the embodiment of this invention shown in Figs. 1 and 2, a thin zinc sheet or foil 10 is rolled upon itself to form a tube, the walls of which are thus made to consist of a multiplicity of layers of zinc. While only three layers are shown, this is done for simplicity and as many layers may be used as are desired. A terminal lead 11 is soldered to the outer layer. The end edge 12 of the sheet 10 may be attached to the adjacent metal surfaces by solder, but preferably by a lacquer cement, or a thermo plastic resin which on heating and cooling forms a tight and waterproof joint. The end of the tube is closed by a zinc cap 13 which may be flanged as shown so as to fit tightly upon the end of the tube. The joint is made water-tight by solder or resin or any other suitable material. As an alternative, the end cap 13 may be of paper or other suitable material, coated with paraffin or other water and zinc chloride resisting substance, or it may be composed of a fusible sealing compound such as is usually used for the top closures of cells. After the can is thus formed, the active ingredients, such as the depolarizing core 14, the carbon electrode 15, the electrolyte paste 16, the top washer 17 and the top closure 18, are inserted in the usual way and a tube 19 of paper or other electrical insulating material may be fitted over the zinc tube. The paper tube 19 extends above the top of the zinc tube and the top seal covers the end of the zinc tube as shown.

If a bottom closure of zinc is used a layer of paper or other electrical insulating material 20, impregnated with paraffin or other suitable water and zinc chloride resisting substance, is interposed between the bottom end closure and the bottom of the depolarizing core.

In the preferred embodiment of this invention a film of thermoplastic resin is arranged between the superimposed layers of zinc. The resin is applied to a portion of the surface of the zinc sheet such that when the sheet is rolled into an approximately cylindrical tube, the film of thermoplastic resin lies between the entire superposed areas of the successive layers of zinc and leaves exposed the interior surface of the tube. Upon applying heat such that the resin becomes plastic and sticky, and then cooling, the layers of zinc adhere together and form a rigid, watertight tube. The layers are separated from one another by the film of resin, and this separation provides important advantages as will be pointed out hereinafter, while, at the same time, the film permits the electrolyte to have access to the succeeding layers of zinc as the dry cell becomes discharged in use.

A polymerized vinyl acetate resin is the preferred material. It is a thermoplastic, adhesive resin, which is normally non-conductive. However, a thin film of this substance, when exposed to the electrolyte is slightly permeable to the electrolyte solution and when the external circuit is closed, the film becomes dissolved, disintegrated, decomposed or otherwise affected so that it permits the ready flow of current. The character of the action by the electrolyte is not understood but the film is affected in such a way that sufficient current is permitted to flow to render the cell operative for all types of service. The resin is applied by making a dilute solution thereof in a suitable solvent, such as acetone, and applying the solution to the zinc surface. The solvent evaporates, leaving the thermoplastic resin coating on the zinc. The adhesive separating layer is shown at 21 in Fig. 3.

Other materials than thermoplastic resin may be used between the superimposed layers of zinc. The material should be of such composition that it is permeable to the electrolyte, or is dissolved by the electrolyte or otherwise affected, to afford access of the electrolyte to the succeeding layers of zinc as the dry cell becomes discharged. The action should occur with sufficient promptness so that the galvanic action of the battery is not interfered with by the separating material. Other suitable adhesives are hide glue and boiled starch adhesive. Regenerated cellulose may be used and other materials having a cellulose base, or containing cellulosic ingredients. Such materials are destroyed by strong zinc chloride solutions.

The local couples which develop in dry cells having the ordinary soldered, extruded or drawn zinc cans are largely eliminated by the use of my improved multiple-layer can. This is because the strains and other non-uniformities, which are commonly caused by the forming operations and the use of hot solder are avoided. In addition, any non-uniformities which may be present do not extend through the entire thickness of the can wall but only through the thickness of one layer. As a result, dry cells employing the multiple layer electrodes of this invention are relatively free from objectionable perforation of the can by local action. The properties of the battery and especially the storage or "shelf" life, are improved as a consequence. When the cell is placed into action by the delivery of current, the inner layer of zinc is attacked first and is corroded until it is substantially consumed. The adjacent layer of separating material is then exposed and is dissolved, decomposed, or otherwise affected by the electrolyte, as described heretofore.

During the electrolytic corrosion of the inner zinc layer, a quantity of zinc chloride is formed at the surface of the zinc layer and goes into solution in the aqueous electrolyte. The separating materials, which are permeable to zinc chloride solution, are softened and made more conductive by such solution when they become exposed thereto. All of the adhesive separating materials described herein are affected by the electrolyte in the presence of electrolytic action in such a way that the succeeding layers of zinc are progressively made accessible to the electrolyte and the galvanic action of the dry cell proceeds in a regular and uniform manner until the layers of zinc are substantially consumed. Any local action which may have started is confined to the layer in which it occurs and there are no deep pits or perforations through the can, such as are commonly formed in the ordinary zinc can.

In a different embodiment of the invention, that portion of the zinc which will be exposed to the electrolyte, that is the inner layer, is amalgamated by applying a mercury solution to the clean zinc surface. The mercury is applied only where it is needed, resulting in an efficient and economical use of the mercury, which, under ordinary methods of construction, is distributed throughout the entire thickness of the zinc can.

The described multiple layer construction prevents the mercury from getting upon the outer layer or layers of zinc, and a relatively large proportion of mercury to zinc may be used without encountering the structural weakness which results when the ordinary zinc can is amalgamated with relatively large amounts of mercury.

In a further embodiment of the invention the adhesive separating material may be applied to the entire surface of the zinc sheet whereby a film of the material is provided upon the interior surface of the zinc tube. The film, being permeable to the electrolyte to a restricted degree, permits only a slow diffusion of ions therethrough during the storage period, with the result that the local action which often causes pits and perforations in the zinc can, is decreased and the dry cell is protected. There is sufficient permeability, however, to permit the production of electrical energy when the dry cell is placed in use. With the flow of current, a reaction takes place upon the film, which, as described heretofore, affects the film in such a manner as to permit sufficient current to flow to render the cell operative.

The voltage of a new dry cell is relatively high when it is initially placed in use. The lamps of flashlights sometimes burn out during this initial high-voltage period. The protective interior coating described heretofore prevents the high current caused by the high initial voltage. In fact, the initial current may be slightly lower than the normal. It reaches normal, however, after a short period of use. The protective coating of this invention has the advantage that it is affected so as to permit the flow of current by the action of the dry cell which takes place when the dry cell is placed in use. This insures that the protection will continue throughout the storage period. This interior protective coating may be applied to any type of dry cell can and is not limited to a multiple layer can.

The multiple layer zinc tube of this invention may be used for making a double-ended dry cell. Such a dry cell is illustrated in Fig. 4. A suitable separator 22 may be inserted across the middle of a relatively long multiple layer zinc tube 23, thereby providing two zinc cups in end-to-end relation in the same structure. The active components of the cell comprising the carbon rods 24, depolarizing masses 25, electrolyte, 26, insulating washers 27, and closures 28 are assembled in the usual way in these cups.

As a feature of construction peculiar to this type of container or electrode the terminal lead connected to the zinc electrode may be formed as an integral part of the zinc electrode by cutting the outer end of the rolled sheet 30 as shown in Fig. 5. The sheet of zinc is represented by the rectangle abcd. Portion abef is coated with the adhesive separating material and the area fecd is amalgamated. A cut or slot gh is made in the end portion as shown, and the strip abhg is turned upward to b'h' to constitute a conductive lead 31 for connecting the cell to another cell or to a cooperating external circuit. The zinc sheet 30 is then rolled around a mandril in such a manner that the area fecd constitutes the inner exposed surface of the resulting tube and the terminal lead 31 is connected to the outer layer of zinc. The layers may then be united by a process suitable for the type of adhesive employed. The terminal lead may also be formed as illustrated in Fig. 6 by severing the zinc sheet 32 along the lines kmn in the side marginal portion thereof, the partially severed strip 33 being turned back as shown in dotted lines.

Advantages of this construction, in addition to those mentioned heretofore, are that the performance characteristics are more uniform throughout the life of the battery, the zinc of the zinc can is used efficiently and is consumed completely in the production of electric energy, a purer and softer grade of zinc may be employed than is feasible where drawn cans are used, and there is a complete utilization of zinc in the making of the cans, no scrap zinc being produced as in the drawing of zinc cups. It also is obvious that this type of construction lends itself well to the production of tubes of circular, square, rectangular, oval or other form, and of any desired length.

I claim:

In a dry cell, a zinc electrode having a surface thereof exposed to the electrolyte, and a coating of vinyl acetate resin on said surface.

CHARLES F. BURGESS.